C. P. WINEMAN.
METHOD OF MAKING DRILLS.
APPLICATION FILED JUNE 21, 1919.
1,379,070.
Patented May 24, 1921.
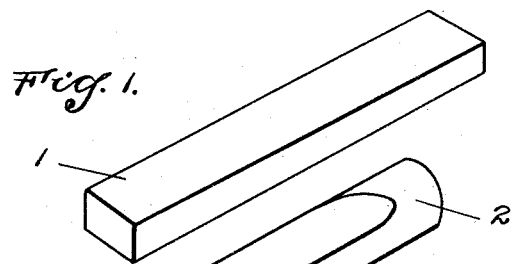
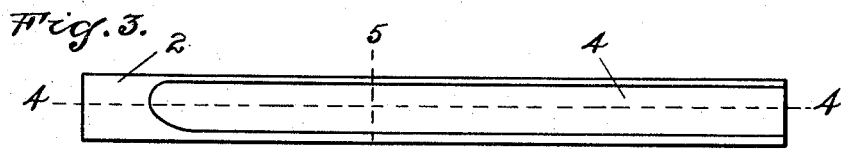
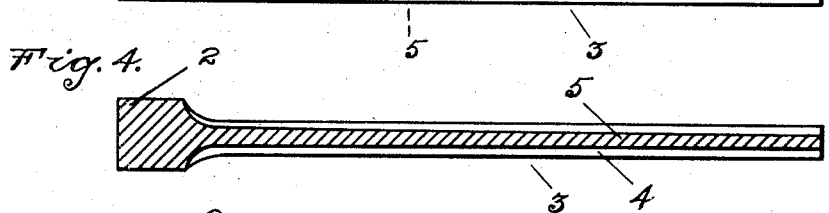
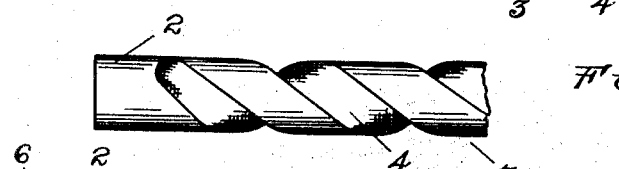
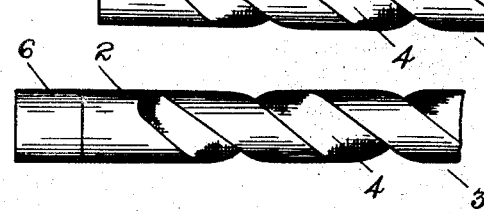
Inventor
Charles P. Wineman
By Whittemore Hulbert & Whittemore
Attorneys

UNITED STATES PATENT OFFICE.

CHARLES P. WINEMAN, OF DETROIT, MICHIGAN, ASSIGNOR TO DETROIT TWIST DRILL COMPANY, OF DETROIT, MICHIGAN, A CORPORATION OF MICHIGAN.

METHOD OF MAKING DRILLS.

1,379,070.　　　　Specification of Letters Patent.　　Patented May 24, 1921.

Application filed June 21, 1919. Serial No. 305,798.

*To all whom it may concern:*

Be it known that I, CHARLES P. WINEMAN, a citizen of the United States of America, residing at Detroit, in the county of Wayne and State of Michigan, have invented certain new and useful Improvements in Methods of Making Drills, of which the following is a specification, reference being had therein to the accompanying drawings.

The invention relates to the manufacture of drills and refers particularly to high speed twist drills. It is well known that structural distortion of high speed steel stock in working the same to produce an article is detrimental since it detracts from the quality of the stock. The object of my invention is to produce a drill with as little structural distortion of the blank of which the drill is formed as possible; and also to produce a drill or the like in such a manner as to save material by utilizing all the stock in the blank instead of cutting part of it away as is done in the milling process. Another object is to produce a drill in which a portion of the shank is formed of low carbon steel which is of considerably less cost than high speed steel. Other objects of the invention reside in further advantages more fully hereinafter set forth.

In the drawings:

Figure 1 is a perspective view of the blank used in forming a drill;

Fig. 2 is a perspective view of the blank after the first step of the operation has been completed;

Fig. 3 is a side view of the blank after the second operation has been completed;

Figs. 4 and 5 are cross sections respectively on lines 4—4 and 5—5 of Fig. 3;

Fig. 6 is a side view of the blank after the third operation has been completed;

Fig. 7 is a side view of the finished article.

Prior to my invention drills have been formed from cylindrical blanks of high speed steel. The first step in this method comprises the form-rolling of a portion of the cylindrical blank by passing the latter between suitable rollers to produce the grooves of the drill. This step involves considerable structural distortion of the blank since there is a relatively large amount of metal to be dispaced, and furthermore it has been found that it is necessary to pass the blank between the form-rollers several times before the grooved portion of the blank is completely formed, especially when operating upon the larger blanks.

With my invention, I form my drill from a polygonal blank 1 of high speed steel, this blank being preferably of rectangular cross-section the thickness of which is substantially equal to the thickness of the segment of the drill fluted portion. The first step in my process is the upsetting of one end portion of the blank 1 to produce the round shank 2 for the drill. The length of the blank 1 is such that when upset the length of the upset portion or shank 2 is comparatively small and the length of the portion 3 of rectangular cross-section is slightly less than the length of the finished grooved portion of the drill. The portion 3 of the rectangular cross-section is now form-rolled by passing the upset blank between suitable form-rollers, thereby producing the grooves 4 in the longer sides of the portion 3. The material displaced by forming the grooves 4 is moved longitudinally of the blank to lengthen the grooved portion of the drill. In forming these grooves 4 but comparatively slight material is displaced so that the effect upon the blank is decidedly less injurious. Furthermore, it is necessary only to pass the upset blank between the form rollers once to completely form the grooves 4.

In form-rolling the upset blank, the arrangement of rollers is such that the web 5 of the fluted portion progressively decreases in thickness from the upset portion or shank 2 to its outer end as shown in Fig. 3.

The blank is now ready for the twisting of the grooved portion, in which successive portions of the grooved portion are successively twisted to form the blank as shown in Fig. 6. A subsequent step comprises the straightening of the blank by rolling the same between straightening rollers.

It is to be understood that the above steps are performed while the metal in the blank is within correct working temperatures.

In order to have a shank for the drill of usual length a piece of stock 6 of suitable low carbon steel is welded to the end of the upset portion 2, the stock 6 being of substantially the same diameter as that of the upset portion.

After straightening of the blank, the metal is annealed, ground and given whatever steps that are necessary to put it into the desired commercial form, these latter steps forming no part of my invention.

From the above description it will be readily seen that I have brought out an improved method of forming drills whereby the cost of manufacture of the same is greatly decreased and their quality increased over previously formed drills. Moreover all the material in the blank is used and there is just enough material to form a round upset or shank portion, so that the use of the high speed steel stock is economical.

What I claim as my invention is:

1. In the method of forming a drill, the form-rolling of a polygonal blank to form the fluted portion of the drill.

2. In the method of forming a drill, the upsetting of a portion of a polygonal blank to produce a round shank for the drill, and the form rolling of another portion of the blank to form a fluted portion for the drill.

3. The method of forming a drill, which comprises the upsetting of an end portion of rectangular blank formed of high speed steel to produce a round shank for the drill, the form rolling of the other end portion of the blank to produce a fluted portion for the drill, and the integrating of the round shank of high speed steel and a piece of low carbon steel of substantially the same diameter.

4. In the method of forming a drill, the step of upsetting a rectangular blank to produce a shank for the drill and the step of forming grooves in another portion of the rectangular blank to form the fluted portion of the drill.

In testimony whereof I affix my signature.

CHARLES P. WINEMAN.